United States Patent
Akima et al.

(10) Patent No.: US 12,227,660 B2
(45) Date of Patent: Feb. 18, 2025

(54) INK, PRINTING METHOD, PRINTING DEVICE, AND PRINTED MATTER

(71) Applicants: Mio Akima, Tokyo (JP); Masaki Kudo, Kanagawa (JP); Tomohiro Hirade, Kanagawa (JP); Nozomi Terai, Tokyo (JP)

(72) Inventors: Mio Akima, Tokyo (JP); Masaki Kudo, Kanagawa (JP); Tomohiro Hirade, Kanagawa (JP); Nozomi Terai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 752 days.

(21) Appl. No.: 17/315,362

(22) Filed: May 10, 2021

(65) Prior Publication Data

US 2021/0363369 A1 Nov. 25, 2021

(30) Foreign Application Priority Data

May 25, 2020 (JP) .................. 2020-090360
Oct. 12, 2020 (JP) .................. 2020-171657

(51) Int. Cl.
*B32B 3/10* (2006.01)
*C09D 11/102* (2014.01)
*C09D 11/107* (2014.01)
*C09D 11/38* (2014.01)

(52) U.S. Cl.
CPC ............ *C09D 11/38* (2013.01); *C09D 11/102* (2013.01); *C09D 11/107* (2013.01)

(58) Field of Classification Search
None
See application file for complete search history.

(56) References Cited

U.S. PATENT DOCUMENTS

| 2010/0209611 A1 | 8/2010 | Ohshima et al. |
| 2011/0205288 A1 | 8/2011 | Matsuyama et al. |
| 2012/0121831 A1 | 5/2012 | Kudoh et al. |

(Continued)

FOREIGN PATENT DOCUMENTS

| JP | S62-101669 A | 5/1987 |
| JP | H06-322305 A | 11/1994 |

(Continued)

OTHER PUBLICATIONS

Machine translation of JP2013112748A (Year: 2013).*
Office Action issued May 7, 2024 in Japanese Patent Application No. 2020-171657, 8 pages.
Office Action issued Oct. 8, 2024 in Japanese Patent Application No. 2020-171657, 11 pages.

(Continued)

*Primary Examiner* — Christopher M Polley
(74) *Attorney, Agent, or Firm* — XSENSUS LLP

(57) ABSTRACT

Provided is an ink including water, an organic solvent, resin particles, and a thickener. The thickener comprises polymer particles having a carboxylic acid structure. A proportion of the thickener in the ink is 0.05% by mass or more. Change in viscosity of the ink between before and after storage of the ink at 70° C. for 1 week is 20% or less. The change in viscosity is expressed by Formula (1): Change in viscosity (%)=[(a−b)/b]×100 . . . Formula (1), where a represents a viscosity (mPa·s) at 25° C. of the ink when the ink is prepared, and b represents a viscosity (mPa·s) at 25° C. of the ink after the ink is stored at 70° C. for 1 week.

13 Claims, 1 Drawing Sheet

(56) References Cited

U.S. PATENT DOCUMENTS

| | | |
|---|---|---|
| 2013/0063524 A1 | 3/2013 | Katoh et al. |
| 2013/0197144 A1 | 8/2013 | Katoh et al. |
| 2013/0271524 A1 | 10/2013 | Katoh et al. |
| 2017/0349772 A1 | 12/2017 | Hirade et al. |
| 2018/0339525 A1 | 11/2018 | Katoh et al. |
| 2019/0031897 A1 | 1/2019 | Hirade et al. |
| 2019/0185690 A1 | 6/2019 | Umemura et al. |
| 2019/0249020 A1 | 8/2019 | Matsuyama et al. |
| 2019/0381810 A1 | 12/2019 | Takahashi et al. |
| 2020/0016898 A1 | 1/2020 | Sagara et al. |
| 2020/0023648 A1 | 1/2020 | Gotou et al. |
| 2020/0039245 A1 | 2/2020 | Akima et al. |
| 2020/0157366 A1 | 5/2020 | Gotou et al. |
| 2020/0171832 A1 | 6/2020 | Akima et al. |

FOREIGN PATENT DOCUMENTS

| | | |
|---|---|---|
| JP | 7-150090 | 6/1995 |
| JP | 2006-104357 | 4/2006 |
| JP | 2007-332286 A | 12/2007 |
| JP | 2009-220529 | 10/2009 |
| JP | 2013112748 A * | 6/2013 |
| JP | 2013-159689 | 8/2013 |
| JP | 2017-217914 A | 12/2017 |

OTHER PUBLICATIONS

Notification issued Aug. 23, 2024 in Japanese Patent Application No. 2020-171657 with Japanese Publication Submission Paper Submitted by Third Party, 10 pages. (with Partial English Translation).

* cited by examiner

INK, PRINTING METHOD, PRINTING DEVICE, AND PRINTED MATTER

CROSS-REFERENCE TO RELATED APPLICATIONS

This patent application is based on and claims priority pursuant to 35 U.S.C. § 119(a) to Japanese Patent Application No. 2020-090360, filed on May 25, 2020 and Japanese Patent Application No. 2020-171657, filed on Oct. 12, 2020, in the Japan Patent Office, the entire disclosure of each of which is hereby incorporated by reference herein.

BACKGROUND

Technical Field

The present disclosure relates to an ink, a printing method, a printing device, and a printed matter.

Description of the Related Art

In recent years, inkjet printers have been used not only for home use but also for industrial applications, such as for cloth, plastic films, wallpaper, and window films.

When an ink coating is formed from an aqueous inkjet ink using the inkjet printer, the ink coating may be degraded in scratch resistance due to insufficient dryness of the ink coating.

SUMMARY

According to one aspect of the present disclosure, an ink includes water, an organic solvent, resin particles, and a thickener. The thickener comprises polymer particles having a carboxylic acid structure. A proportion of the thickener in the ink is 0.05% by mass or more. Change in viscosity of the ink between before and after storage of the ink at 70° C. for 1 week is 20% or less. The change in viscosity is expressed by Formula (1) below:

Change in viscosity (%)=[($a-b$)/$b$]×100        Formula (1).

In the Formula (1), a represents a viscosity (mPa·s) at 25° C. of the ink when the ink is prepared, and b represents a viscosity (mPa·s) at 25° C. of the ink after the ink is stored at 70° C. for 1 week.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
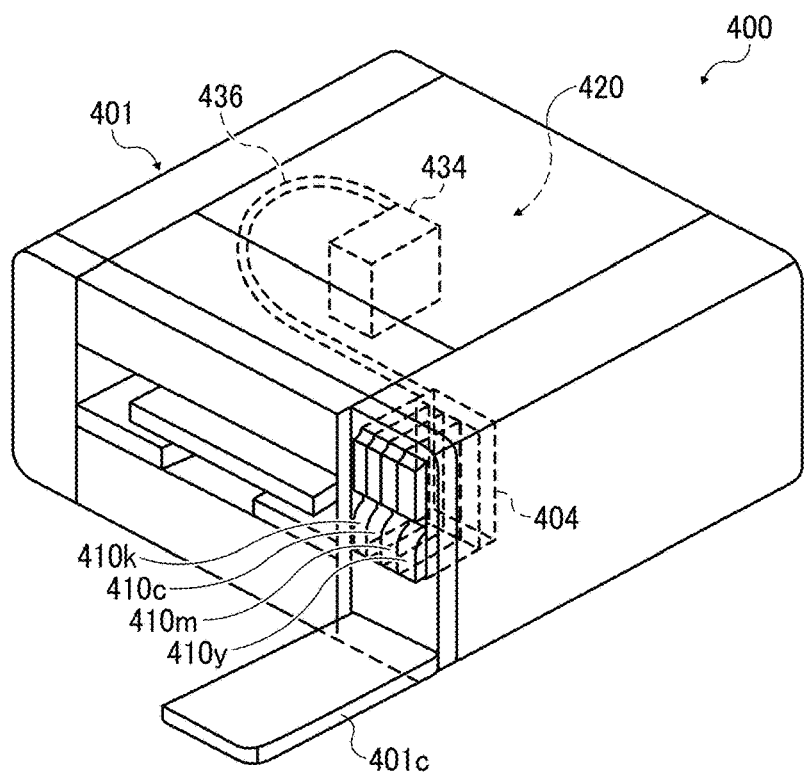
FIG. 1 is a perspective view illustrating a printing device according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to the present disclosure, an ink is provided that ensures an appropriate range of viscosity, has excellent storage stability, and can form an ink coating excellent in scratch resistance.

(Ink)

An ink of the present disclosure includes water, an organic solvent, resin particles, and a thickener, and the thickener comprises polymer particles having a carboxylic acid structure. If necessary, the ink further includes other components.

In related art, the thickener is not polymer particles having a carboxylic acid structure but a water-soluble polymer which is soluble in the ink. The ink of related art cannot ensure an appropriate range of viscosity, have excellent storage stability, and form an ink coating excellent in scratch resistance.

In the ink of the present disclosure, the change in viscosity of the ink between before and after storage of the ink at 70° C. for 1 week is 20% or less, preferably 15% or less, more preferably 10% or less, further preferably 8% or less, particularly preferably 6% or less, where the change in viscosity is expressed by Formula (1) below:

Change in viscosity (%)=[($a-b$)/$b$]×100        Formula (1).

In the Formula (1), a represents a viscosity (mPa·s) at 25° C. of the ink when the ink is prepared, and b represents a viscosity (mPa·s) at 25° C. of the ink after the ink is stored at 70° C. for 1 week.

Storage test at 70° C. for 1 week is an accelerated test of storageability of an ink and is equivalent to storage test at 23° C. for 720 days.

An ink having the change in viscosity expressed by the above Formula (1) of 20% or less can be advantageously stably discharged in printing using an inkjet printing device even after storage at 23° C. for 720 days.

The viscosity can be measured by, for example, a rotatory viscometer (RE-80L, manufactured by TOM SANGYO CO., LTD.). The measuring conditions are as follows:
Standard cone rotor (1° 34'×R24)
Sample liquid amount: 1.2 mL
Number of rotations: 50 rotations per minute (rpm)
25 degrees C.
Measuring time: three minutes The thickener preferably has a thickening rate expressed by the following Formula (2) of 10% or more, more preferably 20% or more, further preferably 50% or more, particularly preferably 70% or more:

Thickening rate (%)=[($\alpha-\beta$)/$\beta$]×100        Formula (2).

In the Formula (2), $\alpha$ represents a viscosity (mPa·s) at 25° C. of the ink when the thickener in an amount of 0.1% by mass of the ink is added to the ink, and $\beta$ represents a viscosity (mPa·s) at 25° C. of the ink before the thickener is added to the ink.

The thickener having the thickening rate (%) of 10% or more has a thickening effect and can achieve adjustment of the proportion of a high-boiling-point organic solvent in the ink.

The viscosity of the ink can be measured in the same manner as in the measurement of the change in viscosity before and after storage of the ink at 70° C. for 1 week.

The ink of the present disclosure includes water, an organic solvent, resin particles, and a thickener, and if necessary, further includes other components such as a coloring material, a surfactant, a defoaming agent, preservatives and fungicides, a corrosion inhibitor, and a pH regulator.

<Thickener>

The thickener is polymer particles having a carboxylic acid structure. The polymer particles are not a water-soluble polymer. The polymer particles are dispersed (emulsified) in the solvent or the ink.

The volume average particle diameter of the thickener is not particularly limited and may be appropriately selected depending on the intended purpose. It is preferably 1 nm or more but 300 nm or less, more preferably 10 nm or more but 150 nm or less.

The volume average particle diameter can be measured using, for example, a particle size analyzer (NANOTRAC WAVE-UT151, available from MicrotracBEL Corp.).

The thickener is not particularly limited and may be appropriately selected depending on the intended purpose as long as the thickening rate expressed by the Formula (2) is 10% or more. Examples thereof include, but are not limited to, polyacrylic acid partially neutralized products, thickeners AP-40F, AP-50, and AP-70 available from Dainichiseika Color & Chemicals Mfg. Co., Ltd.; alginic acid available from KIMICA Corporation; sodium carboxymethyl cellulose (CMC) 1220, 1240, 1250, 1260, 1330, 1350, 1380, or 1390, which is one of the cellulose-based water-soluble polymers available from Daicel Miraizu Ltd.; HM pectin and LM pectin available from SANSHO Co., Ltd., each of which has a structure where galacturonic acid having a carboxyl group is bonded in the form of a straight chain with a galacturonic acid methyl ester which is galacturonic acid whose carboxyl group is methyl-esterified; acrylic thickeners composed mainly of sodium acrylate, A-20P-X, A-20L, A-7055, A-7100, A-10H, A-30, A-7255, A-7185, A-7195, B-300K, B-500, AC-10LHPK, AC-10SHP, 260H, 845H, and PW-120 available from TOAGOSEI CO., LTD.; and sodium alginate available from DSP GOKYO FOOD & CHEMICAL Co., Ltd. One of these may be used alone or two or more of these may be used in combination. Of these, from the viewpoint of favorable dispersion stability, acrylic emulsion is preferable, and emulsion-type acrylic thickeners composed mainly of sodium: A-7055, B-300K, and B500 acrylate available from TOAGOSEI CO., LTD. are particularly preferable.

The proportion of the thickener in the ink is 0.05% by mass or more, preferably 0.05% by mass or more but 2% by mass or less, more preferably 0.05% by mass or more but 1% by mass or less, further preferably 0.05% by mass or more but 0.5% by mass or less, particularly preferably 0.1% by mass or more but 0.5% by mass or less.

The proportion of the thickener being 0.05% by mass or more is advantageous because the thickener does not give adverse effects to discharge stability.

<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethylpropionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; and polyol aryl ethers such as ethylene glycol monophenyl ether and ethylene glycol monobenzyl ether. One of these may be used alone or two or more of these may be used in combination.

The proportion of the organic solvent in the ink is preferably 5% by mass or more but 30% by mass or less.

The organic solvent accounting for 5% by mass or more of the ink can ensure ink moisture retainability and provide an ink having excellent discharge stability.

The organic solvent accounting for 30% by mass or less of the ink imparts favorable drying property to a formed ink coating and improves the ink coating in scratch resistance.

<Water>

The water is not particularly limited and may be appropriately selected depending on the intended purpose. Examples thereof include, but are not limited to, pure water and ultrapure water such as ion-exchanged water, ultrafiltration water, reverse osmosis water, and distilled water.

The amount of the water in the ink is not particularly limited and may be appropriately selected depending on the intended purpose. In terms of drying properties and discharge reliability of the ink, the proportion of the water in the ink is preferably 10% by mass or more but 90% by mass or less, more preferably 20% by mass or more but 60% by mass or less.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, 213, C.I. Pigment Orange 5, 13, 16, 17, 36, 43, 51, C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, 264, C.I. Pigment Violet 1 (Rhodamine Lake), 3, 5:1, 16, 19, 23, 38, C.I. Pigment Blue 1, 2, 15 (Phthalocyanine Blue), 15:1, 15:2, 15:3, 15:4 (Phthalocyanine Blue), 16, 17:1, 56, 60, 63, C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably 0.1% by mass or more but 15% by mass or less, more preferably 1% by mass or more but 10% by mass or less, in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably 20 nm or more but 500 nm or less and more preferably 20 or more but 150 nm or less to improve dispersion stability of the pigment and ameliorate the discharging stability and image quality such as image density. The particle diameter of the pigment can be measured using a particle size analyzer (NANOTRAC WAVE-UT151, manufactured by MicrotracBEL Corp).

In addition, the proportion of the pigment in the pigment dispersion is not particularly limited and can be suitably selected to suit a particular application. In terms of improving discharging stability and image density, the content is preferably 0.1% by mass or more but 50% by mass or less, more preferably 0.1% by mass or more but 30% by mass or less.

During the production, coarse particles are optionally filtered off with a filter, a centrifuge, etc. preferably followed by degassing.

<Preparation of Pigment Dispersion Liquid>

To obtain the ink, the pigment is dispersed by, for example, preparing a self-dispersible pigment by introducing a hydrophilic functional group into the pigment, coating the surface of the pigment with resin, or using a dispersant.

—Self-Dispersible Pigment—

To prepare a self-dispersible pigment by introducing a hydrophilic functional group into a pigment, for example, it is possible to add a functional group such as sulfone group and carboxyl group to the pigment (e.g., carbon) to disperse the pigment in water.

—Resin-Coated Pigment—

To coat the surface of the pigment with resin, the pigment is encapsulated by microcapsules to make the pigment dispersible in water. This can be referred to as a resin-coated pigment. In this case, the pigment to be added to ink is not necessarily coated with resin. Pigments partially or wholly uncovered with resin may be dispersed in the ink unless the pigments have an adverse impact.

<Resin>

The type of the resin contained in the ink has no particular limit. Specific examples thereof include, but are not limited to, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. These can be used alone or in combination of the resin particles. Of these, at least one selected from the group consisting of acrylic resin particles and polyurethane resin particles is preferable.

The volume average particle diameter of the resin particle is not particularly limited and can be suitably selected to suit to a particular application. The volume average particle diameter is preferably 10 nm or more but 1,000 nm or less, more preferably 10 nm or more but 200 nm or less, and furthermore preferably 10 nm or more but 100 nm or less to obtain good fixability and image hardness.

The volume average particle diameter can be measured by using a particle size analyzer (NANOTRAC WAVE-UT151, manufactured by MicrotracBEL Corp.).

The proportion of the resin is not particularly limited and can be suitably selected to suit to a particular application. In terms of fixability and storage stability of ink, it is preferably from 1% by mass or more but 30% by mass or less, more preferably from 5% by mass or more but 20% by mass or less, to the total content of the ink.

The particle diameter of the solid portion in ink has no particular limit. For example, the maximum frequency particle diameter in the number conversion is preferably 20 nm or more but 1,000 nm or less, more preferably 20 nm or more but 150 nm or less, to ameliorate the discharging stability and image quality such as image density.

The solid portion includes resin particles, particles of pigments, etc. The particle diameter of the solid portion can be measured by using a particle size analyzer (NANOTRAC WAVE-UT151, manufactured by MicrotracBEL Corp).

<Surfactant>

Examples of the surfactant include silicone-based surfactants, fluorosurfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluorosurfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorosurfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from BYK Chemie K.K., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit. For example, a compound in which the polyalkylene oxide structure represented by the following Chemical structure S-1 is introduced into the side chain of the Si site of dimethyl polysiloxane.

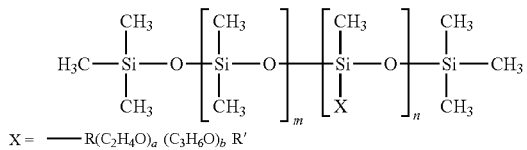

Chemical structure S-1

In the Chemical structure S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie K.K.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

Chemical formula F-1

In the Chemical formula F-1, "m" is preferably 0 or an integer of from 1 to 10 and "n" is preferably 0 or an integer of from 1 to 40.

Chemical formula F-2

In the Chemical formula F-2, Y represents H, $C_mF_{2m+1}$, where m represents an integer of from 1 to 6, $H_2CH(OH)$ $CH_2$—$C_mF_{2m+1}$, where m represents an integer of from 4 to 6, or $C_pH_{2p+1}$, where p represents an integer of from 1 to 19. "n" represents an integer of from 1 to 6. "a" represents an integer of from 4 to 14.

Products available on the market may be used as the fluorosurfactant.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FT-110, FT-250, FT-251, FT-400S, FT-150, and FT-400SW (all manufactured by The Chemours Company), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazolin-3-one.

<Corrosion Inhibitor>

The corrosion inhibitor has not particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, ratio (A/B) of viscosities at different shearing rates (viscosity ratio (A/B)), surface tension, pH, etc., are preferably in the following ranges.

The viscosity at 25° C. of the ink is preferably 6 mPa·s or higher but 13 mPa·s or lower. The ink having the viscosity at 25° C. of 6 mPa·s or higher but 13 mPa·s or lower improves print density and image quality and provides favorable dischargeability.

The viscosity of the ink can be measured in the same manner as in the measurement of the change in viscosity.

The viscosity ratio (A/B) of the ink is preferably 2.00 or less, more preferably 1.50 or less, where A denotes a viscosity at 25° C. and at a shearing rate of 100 (1/s) and B denotes a viscosity at 25° C. and at a shearing rate of 100,000 (1/s). When the viscosity ratio (A/B) is 2.00 or less, the ink can have favorable dischargeability.

The viscosity of the ink at the shearing rate can be measured, for example, using a rheometer (MCR301, available from AntonPaar Co.).

The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper, floor material, and tiles, cloth for apparel such as T-shirts, textile, and leather as the print medium. In addition, the configuration of the paths through which the print medium is transferred can be adjusted to accommodate ceramics, glass, metal, etc.

(Printed Matter)

The printed patter of the present disclosure includes a print medium and an ink layer on the print medium, the ink layer containing a solid portion in the ink of the present disclosure.

Examples of the solid portion in the ink include, but are not limited to, resin particles, pigment particles, and polymer particles of the thickener.

The printed matter of the present disclosure includes a print medium and an image formed on the print medium with the ink of the present disclosure.

An inkjet printing device and an inkjet printing method are used to print the image on the print medium to obtain the printed matter.

<Printing Device and Printing Method>

A printing method of the present disclosure includes an ink discharging step of allowing energy to act on the ink of the present disclosure to discharge the ink, to form an image, preferably includes a heating step of heating the image, and if necessary, further includes other steps.

A printing device of the present disclosure includes an ink discharging unit configured to allow energy to act on the ink of the present disclosure to discharge the ink, to form an image, preferably includes a heating unit of heating the image, and if necessary, further includes other units.

Examples of the energy include, but are not limited to, thermal energy and mechanical energy. Examples of energy generators include, but are not limited to, a heating device, a pressing device, a piezoelectric element, a vibration generator, an ultrasonic oscillator, and a light. Specific examples thereof include, but are not limited to, a piezoelectric actuator such as a piezoelectric element, a thermal actuator utilizing phase transition by film boiling of liquid using a thermoelectric conversion element such as a heat element, a shape-memory alloy actuator using phase transition of a metal by change in temperature, and an electrostatic actuator using an electrostatic force.

In the present disclosure, in order to improve drying property and fixability onto the non-permeating substrate, the drying temperature in printing is preferably 50° C. or higher. The upper limit of the drying temperature in printing is not particularly limited and may be appropriately selected depending on the intended purpose. In terms of discharge reliability and thermal deformation of the substrate, the upper limit of the drying temperature is preferably 120° C. or lower. In terms of wetting property of the ink onto the substrate, the upper limit of the drying temperature is more preferably 90° C. or lower. The drying temperature before printing or after printing is not particularly limited and may be appropriately selected depending on the intended purpose. In terms of discharge reliability and thermal deformation of the substrate, the drying temperature is preferably 100° C. or lower.

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices.

In the present disclosure, the printing device and the printing method represent a device capable of discharging ink, various processing liquids, etc. to a print medium and a method printing an image on the print medium using the device. The print medium means an article to which the ink or the various processing fluids can be attached at least temporarily.

The printing device may further optionally include a device to attach pre-coating liquid and a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
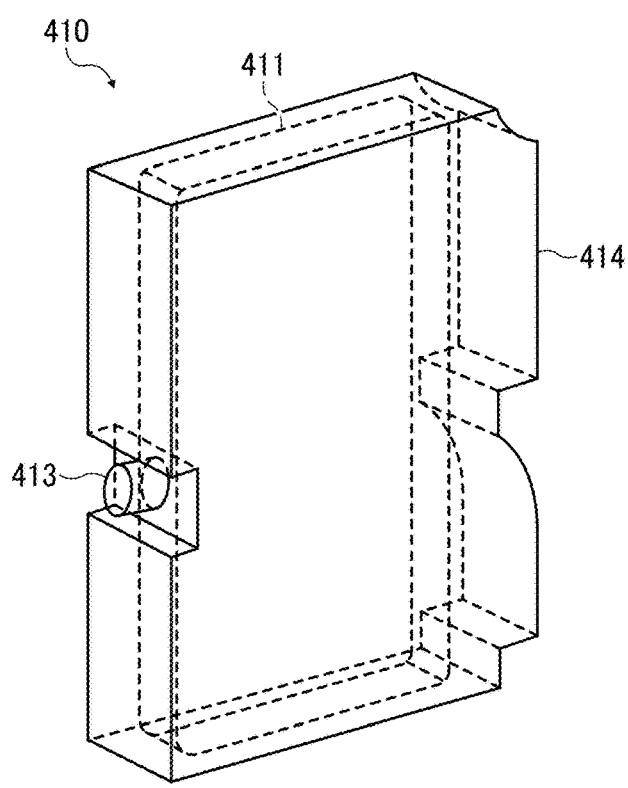
FIG. 2 is a perspective view illustrating a main tank in the printing device.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410*k*, 410*c*, 410*m*, and 410*y*) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

Moreover, image forming, recording, printing, etc. in the present disclosure represent the same meaning.

A print medium, media, and a printing target represent the same meaning.

EXAMPLES

The present disclosure will be described below by way of Examples. The present disclosure should not be construed as being limited to these Examples. Unless otherwise stated, preparation, evaluation, etc. in Examples and Comparative Examples were performed at 25° C. and at a relative humidity of 60%.

Preparation Example 1 of Pigment Dispersion Liquid

<Preparation of Black Pigment Dispersion Liquid (Dispersed-by-Dispersant Type)>

A mixture of the components in the following formulation was pre-mixed. The mixture was dispersed with circulation for 7 hours with a disc-type bead mill (model KDL obtained from Shinmaru Enterprises Corporation, media used: zirconia balls of 0.3 mm in diameter) to obtain a black pigment dispersion liquid.

[Formulation]
    Carbon black (product name: Monarch 800, obtained from Cabot Corporation): 15 parts by mass
    Anionic surfactant (PIONIN A-51-B, obtained from TAKEMOTO OIL & FAT CO., LTD.): 2 parts by mass
    Ion-exchanged water: 83 parts by mass Preparation Example 2 of Pigment Dispersion Liquid <Preparation of Cyan Pigment Dispersion Liquid (Dispersed-by-Dispersant Type)>

A cyan pigment dispersion liquid was obtained in the same manner as in Preparation Example 1 of Pigment Dispersion Liquid except that the carbon black was changed to Pigment Blue 15:3 (product name: LIONOL BLUE FG-7351, obtained from TOYO INK CO., LTD.).

Preparation Example 3 of Pigment Dispersion Liquid

<Preparation of Magenta Pigment Dispersion Liquid (Dispersed-by-Dispersant Type)>

A magenta pigment dispersion liquid was obtained in the same manner as in Preparation Example 1 of Pigment Dispersion Liquid except that the carbon black was changed to Pigment Red 122 (product name: Toner Magenta E002, obtained from Clariant Japan K.K.).

Preparation Example 4 of Pigment Dispersion Liquid

<Preparation of Yellow Pigment Dispersion Liquid (Dispersed-by-Dispersant Type)>

A yellow pigment dispersion liquid was obtained in the same manner as in Preparation Example 1 of Pigment Dispersion Liquid except that the carbon black was changed to Pigment Yellow 74 (product name: Fast Yellow 531, obtained from Dainichiseika Color & Chemicals Mfg. Co., Ltd.).

Preparation Example 5 of Pigment Dispersion Liquid

<Preparation of Black Pigment Dispersion Liquid (Resin-Coated Type)>
<<Preparation of Polymer Solution>>

A 1 L-flask equipped with a mechanical stirrer, a thermometer, a nitrogen-introducing tube, a reflux tube, and a dropping funnel was thoroughly purged with nitrogen. In the flask, styrene (11.2 g), acrylic acid (2.8 g), lauryl methacrylate (12.0 g), polyethylene glycol methacrylate (4.0 g), styrene macromere (4.0 g), and mercaptoethanol (0.4 g) were mixed. The mixture was heated to 65° C.

Next, a mixture solution of styrene (100.8 g), acrylic acid (25.2 g), lauryl methacrylate (108.0 g), polyethylene glycol methacrylate (36.0 g), hydroxyethyl methacrylate (60.0 g), styrene macromere (36.0 g), mercaptoethanol (3.6 g), azobismethylvaleronitrile (2.4 g), and methyl ethyl ketone (18 g) was dropped into the flask for 2.5 hours. After dropping, a mixture solution of azobismethylvaleronitrile (0.8 g) and methyl ethyl ketone (18 g) was dropped into the flask for 0.5 hours. Aging of the mixture at 65° C. for 1 hour was followed by addition of azobismethylvaleronitrile (0.8 g). The mixture was aged for another 1 hour. After completion of reaction, methyl ethyl ketone (364 g) was added into the flask to obtain 800 g of a polymer solution having a concentration of 50% by mass.

<<Preparation of Pigment-Containing Polymer Particles Dispersion Liquid>>

The obtained polymer solution (28 g), carbon black (product name: Monarch 800, obtained from Cabot Corporation) (42 g), a 1 mol/L aqueous potassium hydroxide solution (13.6 g), methyl ethyl ketone (20 g), and ion-exchanged water (13.6 g) were thoroughly mixed. The mixture was kneaded with a roll mill to obtain a paste.

The obtained paste was charged into pure water (200 g), followed by thoroughly stirring. An evaporator was used to evaporate the methyl ethyl ketone and the water. In order to remove coarse particles, the mixture was filtrated under pressure through a polyvinylidene fluoride membrane filter having an average pore diameter of 5.0 μm, to obtain a black pigment dispersion liquid (resin-coated type) containing the pigment by 15% by mass and the solid portion by 20% by mass.

Preparation Example 6 of Pigment Dispersion Liquid

<Preparation of Cyan Pigment Dispersion Liquid (Resin-Coated Type)>

In the same manner as in Preparation Example 5 of Pigment Dispersion Liquid except that the carbon black was changed to Pigment Blue 15:3 (product name: LIONOL BLUE FG-7351, obtained from TOYO INK CO., LTD.), a cyan pigment dispersion liquid (resin-coated type) containing the pigment by 15% by mass and the solid portion by 20% by mass was obtained.

Preparation Example 7 of Pigment Dispersion Liquid

<Preparation of Magenta Pigment Dispersion Liquid (Resin-Coated Type)>

In the same manner as in Preparation Example 5 of Pigment Dispersion Liquid except that the carbon black was changed to Pigment Red 122 (product name: Toner Magenta E002, obtained from Clariant Japan K.K.), a magenta pigment dispersion liquid (resin-coated type) containing the pigment by 15% by mass and the solid portion by 20% by mass was obtained.

Preparation Example 8 of Pigment Dispersion Liquid

<Preparation of Yellow Pigment Dispersion Liquid (Resin-Coated Type)>

In the same manner as in Preparation Example 5 of Pigment Dispersion Liquid except that the carbon black was changed to Pigment Yellow 74 (product name: Fast Yellow 531, obtained from Dainichiseika Color & Chemicals Mfg. Co., Ltd.), a yellow pigment dispersion liquid (resin-coated type) containing the pigment by 15% by mass and the solid portion by 20% by mass was obtained.

Examples 1 to 32 and Comparative Examples 1 to 5

<Production of Inks>

In accordance with the ink formulations described in Table 1-1 to Table 5 below, the materials were mixed and stirred. The mixture was filtrated through a polypropylene filter having an average pore diameter of 1.0 μm, to produce inks. The amount of the resin is based on the concentration of the solid portion (% by mass).

Next, each of the obtained inks was measured in the following manners for "viscosity of ink", "change in viscosity", and "ratio of viscosities at different shearing rates". Results are presented in Table 1-1 to Table 5.

<Viscosity at 25° C. of Ink>

The viscosity of each ink was measured by a rotatory viscometer (RE-80L, obtained by TOKI SANGYO CO., LTD.). The measuring conditions were as follows:
  Standard cone rotor (1° 34'×R24)
  Sample liquid amount: 1.2 mL
  Number of rotations: 50 rpm
  25 degrees C.
  Measuring time: three minutes <Change in Viscosity>

The change in viscosity of each ink between before and after storage of the ink at 70° C. for 1 week was determined, with the change in viscosity being expressed by Formula (1) below:

$$\text{Change in viscosity (\%)} = [(a-b)/b] \times 100 \qquad \text{Formula (1)}.$$

In the Formula (1), a represents a viscosity (mPa·s) at 25° C. of the ink when the ink was prepared, and b represents a viscosity (mPa·s) at 25° C. of the ink after the ink was stored at 70° C. for 1 week.

The viscosity at 25° C. was measured in the above <Viscosity at 25° C. of Ink>.

<Ratio of Viscosities of Ink at Different Shearing Rates>

The ratio of viscosities of each ink at different shearing rates was measured using a rheometer (MCR301, obtained from AntonPaar Co.). The measuring conditions were as follows. Specifically, in the shearing rate range of 0.1 (1/s) or more but less than 1,000 (1/s), a CP50 plate was used at 25° C. to measure 650 μL of a sample, and the measurement was defined as a viscosity denoted by A (viscosity A). In the shearing rate range of 1,000 (1/s) or more but 100,000 (1/s) or less, a PP50 plate was used at 25° C. to measure 140 μL of a sample, and the measurement was defined as a viscosity denoted by B (viscosity B).

In each ink, the viscosity A at the shearing rate of 100 (1/s) and the viscosity B at the shearing rate of 100,000 (1/s) were used to determine the ratio (A/B).

<Image Formation>

In accordance with the ink combinations as described in Table 1-1 to Table 5, the prepared cyan ink, magenta ink, yellow ink, and black ink were charged into ink containers of a modified machine of an inkjet printing device (VC-60000, obtained from Ricoh Company, Limited), to perform printing under the following conditions.

<Printing Conditions>
  Printing speed: 50 m/min
  Resolution: 1,200 dpi×1,200 dpi
  Image to be printed: overlapped image of black, cyan, magenta, and yellow solid images
  Substrate for printing: PVC film (product name: GIY11Z5, obtained from LINTEC Corporation)

<Drying Conditions>
 Pre-heat temperature: 55° C.
 Temperature at printing: 55° C.
 Drying temperature: 80° C.
In accordance with the following methods and evaluation criteria, various properties were evaluated. Results are presented in Table 1-1 to Table 5.
<Inkjet Adaptability (Dischargeability)>
Each ink was continuously discharged for 5 minutes. The state of the printed image at the end of printing was visually observed and evaluated based on the following criteria.
[Evaluation Criteria]
 A: There appeared no image abnormality such as white streaks in the printed image.
 B: There appeared somewhat image abnormalities such as white streaks in the printed image.
 C: There appeared many white streaks in the printed image, and what the image was like was unrecognizable.
 D: The ink was not discharged.
<Static Friction Force>
Each of the image-formed portions was rubbed with cotton cloth, with a load of 200 g being applied under the following evaluation conditions. A static friction force (go was measured and evaluated based on the following criteria.
—Evaluation Conditions—
 Tester: friction and wear tester (model No.: HHS2000S, obtained from Shinto Scientific Co., Ltd.)
 Test piece: 10 mm×10 mm indenter attached with Kanakin No. 3
 Load: 200 g, constant
 Speed: 20 mm/sec
 Test distance: 50 mm
 Measurement mode: measurement of friction at a constant load
[Evaluation Criteria]
 A: The value of static friction force was 60 gf or more.
 B: The value of static friction force was 50 gf or more but less than 60 gf.
 C: The value of static friction force was 46 gf or more but less than 50 gf.
 D: The value of static friction force was less than 46 gf.

<Scratch Resistance Test>
Each of the image-formed portions was rubbed 25 times with cotton cloth, with a load of 200 g being applied. The states of the cotton cloth and the image were visually observed and evaluated based on the following criteria.
[Evaluation Criteria]
 A: Neither of the cotton cloth and the image had any abnormality.
 B: The cotton cloth was colored but there was no noticeable image abnormality.
 C: The cotton cloth was colored and image abnormality was immediately recognizable (the substrate was not exposed).
 D: The cotton cloth was colored and the substrate was exposed.
<Drying Time (Drying Properties)>
At room temperature (25° C.), a polyethylene terephthalate (PET) film (KIMOTO TP188, obtained from KIMOTO Co., Ltd.) (70 mm×150 mm) was provided with an ink coating with a bar coater. The ink coating was placed on a hot plate of 80° C. to measure a time taken until drying, which was evaluated based on the following criteria.
Whether the ink coating had been dried was judged in the following manner. Specifically, a 2 cm×2 cm PET film (KIMOTO TP180, obtained from KIMOTO Co., Ltd.) was placed on the ink coating, and was left to stand still for 10 seconds with a constant load being applied. Then, the 2 cm×2 cm PET film (KIMOTO TP180, obtained from KIMOTO Co., Ltd.) was peeled off. Dryness of the ink coating was defined as the point of time bleed-through did not occur for the first time.
—Evaluation Conditions—
 Substrate: PET (KIMOTO TP180, obtained from KIMOTO Co., Ltd.)
 Coating forming method: wire bar (linear shape), diameter: 0.3 mm
 Coating drying method: hot plate of 55° C.
 Load: blocking jig (load: 103 g/cm$^2$)
[Evaluation Criteria]
 A: Dried within 3 minutes.
 B: Dried for longer than 3 minutes.

TABLE 1-1

|  |  | Examples | | | |
|---|---|---|---|---|---|
|  |  | 1 | 2 | 3 | 4 |
| Pigment | Black pigment dispersion liquid (dispersed-by-dispersant type) | 20 |  | 20 | 20 |
|  | Cyan pigment dispersion liquid (dispersed-by-dispersant type) |  |  |  |  |
|  | Magenta pigment dispersion liquid (dispersed-by-dispersant type) |  |  |  |  |
|  | Yellow pigment dispersion liquid (dispersed-by-dispersant type) |  |  |  |  |
|  | Black pigment dispersion liquid (resin-coated type) |  | 20 |  |  |
|  | Cyan pigment dispersion liquid (resin-coated type) |  |  |  |  |
|  | Magenta pigment dispersion liquid (resin-coated type) |  |  |  |  |
|  | Yellow pigment dispersion liquid (resin-coated type) |  |  |  |  |
| Resin particles | Acrylic resin (A) |  |  | 10 |  |
|  | Acrylic resin (B) | 10 | 10 |  |  |
|  | Urethane resin (C) |  |  |  | 10 |
|  | Urethane resin (D) |  |  |  |  |
| Plastic organic solvent | 3-Methoxy-N,N-dimethylpropionamide | 5 | 5 | 5 | 5 |
|  | 3-Butoxy-N,N-dimethylpropionamide |  |  |  |  |

TABLE 1-1-continued

| | | Examples | | | |
|---|---|---|---|---|---|
| | | 1 | 2 | 3 | 4 |
| Thickener | Thickener (I), Thickening rate by Formula (2): 78% | | | | |
| | Thickener (II), Thickening rate by Formula (2): 20% | 0.1 | 0.1 | 0.1 | 0.1 |
| | Thickener (III), Thickening rate by Formula (2): 68% | | | | |
| | Thickener (IV), Thickening rate by Formula (2): 200% | | | | |
| | Thickener (V), Thickening rate by Formula (2): 150% | | | | |
| Water-soluble organic solvent | Propylene glycol (PG) | 20 | 20 | 20 | 20 |
| Surfactant | Polysiloxane surfactant | 2 | 2 | 2 | 2 |
| Water | Pure water | Balance | Balance | Balance | Balance |
| Total (% by mass) | | 100 | 100 | 100 | 100 |
| Evaluation | Viscosity at 25° C. of ink [mPa · s] | 9 | 9 | 9 | 9 |
| | Change in viscosity (%), expressed by Formula (1), of ink between before and after storage of the ink at 70° C. for 1 week | 3.5 | 3.8 | 3.1 | 6.3 |
| | Ratio (A/B) of viscosity A at a shearing rate of 100 (1/s) to viscosity B at a shearing rate of 100,000 (1/s) | 1.18 | 1.20 | 1.19 | 1.20 |
| | Dischargeability | A | A | A | A |
| | Static friction force — Evaluation | B | B | A | A |
| | Static friction force — Measurement (gf) | 54 | 51 | 61 | 63 |
| | Scratch resistance test | A | A | A | A |
| | Drying time — Evaluation | A | A | A | A |
| | Drying time — Measurement (min) | 3 | 3 | 3 | 3 |

TABLE 1-2

| | | Examples | | | |
|---|---|---|---|---|---|
| | | 5 | 6 | 7 | 8 |
| Pigment | Black pigment dispersion liquid (dispersed-by-dispersant type) | | 20 | 20 | |
| | Cyan pigment dispersion liquid (dispersed-by-dispersant type) | | | | |
| | Magenta pigment dispersion liquid (dispersed-by-dispersant type) | | | | |
| | Yellow pigment dispersion liquid (dispersed-by-dispersant type) | | | | |
| | Black pigment dispersion liquid (resin-coated type) | 20 | | | 20 |
| | Cyan pigment dispersion liquid (resin-coated type) | | | | |
| | Magenta pigment dispersion liquid (resin-coated type) | | | | |
| | Yellow pigment dispersion liquid (resin-coated type) | | | | |
| Resin particles | Acrylic resin (A) | | | | |
| | Acrylic resin (B) | | 8 | 5 | 5 |
| | Urethane resin (C) | 10 | 2 | | |
| | Urethane resin (D) | | | 5 | 5 |
| Plastic organic solvent | 3-Methoxy-N,N-dimethylpropionamide | 5 | 5 | 5 | 5 |
| | 3-Butoxy-N,N-dimethylpropionamide | | | | |
| Thickener | Thickener (I), Thickening rate by Formula (2): 78% | | | | |
| | Thickener (II), Thickening rate by Formula (2): 20% | 0.1 | 0.1 | 0.1 | 0.1 |
| | Thickener (III), Thickening rate by Formula (2): 68% | | | | |
| | Thickener (IV), Thickening rate by Formula (2): 200% | | | | |
| | Thickener (V), Thickening rate by Formula (2): 150% | | | | |
| Water-soluble organic solvent | Propylene glycol (PG) | 20 | 20 | 20 | 20 |
| Surfactant | Polysiloxane surfactant | 2 | 2 | 2 | 2 |
| Water | Pure water | Balance | Balance | Balance | Balance |
| Total (% by mass) | | 100 | 100 | 100 | 100 |
| Evaluation | Viscosity at 25° C. of ink [mPa · s] | 9 | 9 | 9 | 9 |
| | Change in viscosity (%), expressed by Formula (1), of ink between before and after storage of the ink at 70° C. for 1 week | 6.8 | 4.9 | 5.8 | 5.7 |

TABLE 1-2-continued

|  |  | Examples | | | |
|---|---|---|---|---|---|
|  |  | 5 | 6 | 7 | 8 |
| Ratio (A/B) of viscosity A at a shearing rate of 100 (1/s) to viscosity B at a shearing rate of 100,000 (1/s) | | 1.18 | 1.20 | 1.19 | 1.20 |
| Dischargeability | | A | A | A | A |
| Static friction force | Evaluation | A | A | A | A |
|  | Measurement (gf) | 62 | 68 | 71 | 73 |
| Scratch resistance test | | A | A | A | A |
| Drying time | Evaluation | A | A | A | A |
|  | Measurement (min) | 3 | 3 | 3 | 3 |

TABLE 2-1

| | | Examples | | | |
|---|---|---|---|---|---|
| | | 9 | 10 | 11 | 12 |
| Pigment | Black pigment dispersion liquid (dispersed-by-dispersant type) | 20 | 20 | 20 | |
| | Cyan pigment dispersion liquid (dispersed-by-dispersant type) | | | | |
| | Magenta pigment dispersion liquid (dispersed-by-dispersant type) | | | | |
| | Yellow pigment dispersion liquid (dispersed-by-dispersant type) | | | | |
| | Black pigment dispersion liquid (resin-coated type) | | | | 20 |
| | Cyan pigment dispersion liquid (resin-coated type) | | | | |
| | Magenta pigment dispersion liquid (resin-coated type) | | | | |
| | Yellow pigment dispersion liquid (resin-coated type) | | | | |
| Resin particles | Acrylic resin (A) | | | | |
| | Acrylic resin (B) | | 5 | 3 | 20 |
| | Urethane resin (C) | 7 | | | |
| | Urethane resin (D) | 3 | | | |
| Plastic organic solvent | 3-Methoxy-N,N-dimethylpropionamide | | 5 | 5 | 5 |
| | 3-Butoxy-N,N-dimethylpropionamide | | | | |
| Thickener | Thickener (I), Thickening rate by Formula (2): 78% | | | | |
| | Thickener (II), Thickening rate by Formula (2): 20% | 0.1 | 0.1 | 0.1 | 0.1 |
| | Thickener (III), Thickening rate by Formula (2): 68% | | | | |
| | Thickener (IV), Thickening rate by Formula (2): 200% | | | | |
| | Thickener (V), Thickening rate by Formula (2): 150% | | | | |
| Water-soluble organic solvent | Propylene glycol (PG) | 20 | 20 | 20 | 20 |
| Surfactant | Polysiloxane surfactant | 2 | 2 | 2 | 2 |
| Water | Pure water | Balance | Balance | Balance | Balance |
| Total (% by mass) | | 100 | 100 | 100 | 100 |
| Evaluation | Viscosity at 25° C. of ink [mPa · s] | 9 | 9 | 9 | 9 |
| | Change in viscosity (%), expressed by Formula (1), of ink between before and after storage of the ink at 70° C. for 1 week | 7.2 | 2.9 | 2.1 | 6.5 |
| | Ratio (A/B) of viscosity A at a shearing rate of 100 (1/s) to viscosity B at a shearing rate of 100,000 (1/s) | 1.18 | 1.20 | 1.21 | 1.19 |
| | Dischargeability | A | A | A | A |
| | Static friction force  Evaluation | A | B | B | A |
| |  Measurement (gf) | 75 | 58 | 55 | 63 |
| | Scratch resistance test | A | B | B | B |
| | Drying time  Evaluation | A | A | A | A |
| |  Measurement (min) | 3 | 3 | 3 | 3 |

TABLE 2-2

|  |  | Examples | | | |
| --- | --- | --- | --- | --- | --- |
|  |  | 13 | 14 | 15 | 16 |
| Pigment | Black pigment dispersion liquid (dispersed-by-dispersant type) | 20 | 20 |  | 20 |
|  | Cyan pigment dispersion liquid (dispersed-by-dispersant type) |  |  |  |  |
|  | Magenta pigment dispersion liquid (dispersed-by-dispersant type) |  |  |  |  |
|  | Yellow pigment dispersion liquid (dispersed-by-dispersant type) |  |  |  |  |
|  | Black pigment dispersion liquid (resin-coated type) |  |  | 20 |  |
|  | Cyan pigment dispersion liquid (resin-coated type) |  |  |  |  |
|  | Magenta pigment dispersion liquid (resin-coated type) |  |  |  |  |
|  | Yellow pigment dispersion liquid (resin-coated type) |  |  |  |  |
| Resin particles | Acrylic resin (A) |  |  |  |  |
|  | Acrylic resin (B) | 10 | 10 | 10 | 10 |
|  | Urethane resin (C) |  |  |  |  |
|  | Urethane resin (D) |  |  |  |  |
| Plastic organic solvent | 3-Methoxy-N,N-dimethylpropionamide |  | 10 | 20 | 10 |
|  | 3-Butoxy-N,N-dimethylpropionamide | 5 |  |  |  |
| Thickener | Thickener (I), Thickening rate by Formula (2): 78% |  |  | 0.1 |  |
|  | Thickener (II), Thickening rate by Formula (2): 20% | 0.1 | 0.1 |  |  |
|  | Thickener (III), Thickening rate by Formula (2): 68% |  |  |  | 0.1 |
|  | Thickener (IV), Thickening rate by Formula (2): 200% |  |  |  |  |
|  | Thickener (V), Thickening rate by Formula (2): 150% |  |  |  |  |
| Water-soluble organic solvent | Propylene glycol (PG) | 20 | 20 | 20 | 20 |
| Surfactant | Polysiloxane surfactant | 2 | 2 | 2 | 2 |
| Water | Pure water | Balance | Balance | Balance | Balance |
| Total (% by mass) |  | 100 | 100 | 100 | 100 |
| Evaluation | Viscosity at 25° C. of ink [mPa · s] | 9 | 9 | 9 | 9 |
|  | Change in viscosity (%), expressed by Formula (1), of ink between before and after storage of the ink at 70° C. for 1 week | 3.6 | 3.8 | 4.5 | 6.6 |
|  | Ratio (A/B) of viscosity A at a shearing rate of 100 (1/s) to viscosity B at a shearing rate of 100,000 (1/s) | 1.17 | 1.18 | 1.65 | 1.51 |
|  | Dischargeability | A | A | B | B |
|  | Static friction force  Evaluation | B | B | B | A |
|  |                       Measurement (gf) | 54 | 56 | 52 | 59 |
|  | Scratch resistance test | B | B | B | B |
|  | Drying time  Evaluation | A | A | A | A |
|  |              Measurement (min) | 3 | 3 | 3 | 3 |

TABLE 3-1

|  |  | Examples | | | |
| --- | --- | --- | --- | --- | --- |
|  |  | 17 | 18 | 19 | 20 |
| Pigment | Black pigment dispersion liquid (dispersed-by-dispersant type) | 20 | 20 | 20 | 20 |
|  | Cyan pigment dispersion liquid (dispersed-by-dispersant type) |  |  |  |  |
|  | Magenta pigment dispersion liquid (dispersed-by-dispersant type) |  |  |  |  |
|  | Yellow pigment dispersion liquid (dispersed-by-dispersant type) |  |  |  |  |
|  | Black pigment dispersion liquid (resin-coated type) |  |  |  |  |
|  | Cyan pigment dispersion liquid (resin-coated type) |  |  |  |  |
|  | Magenta pigment dispersion liquid (resin-coated type) |  |  |  |  |
|  | Yellow pigment dispersion liquid (resin-coated type) |  |  |  |  |

TABLE 3-1-continued

|  |  | Examples | | | |
| --- | --- | --- | --- | --- | --- |
|  |  | 17 | 18 | 19 | 20 |
| Resin particles | Acrylic resin (A) | | | | |
|  | Acrylic resin (B) | 10 | 10 | 5 | 5 |
|  | Urethane resin (C) | | | | |
|  | Urethane resin (D) | | | | |
| Plastic organic solvent | 3-Methoxy-N,N-dimethylpropionamide | 10 | 10 | 5 | 5 |
|  | 3-Butoxy-N,N-dimethylpropionamide | | | | |
| Thickener | Thickener (I), Thickening rate by Formula (2): 78% | | | 0.05 | |
|  | Thickener (II), Thickening rate by Formula (2): 20% | | | 0.5 | 2 |
|  | Thickener (III), Thickening rate by Formula (2): 68% | | | | |
|  | Thickener (IV), Thickening rate by Formula (2): 200% | 0.05 | | | |
|  | Thickener (V), Thickening rate by Formula (2): 150% | | 0.05 | | |
| Water-soluble organic solvent | Propylene glycol (PG) | 20 | 20 | 20 | 20 |
| Surfactant | Polysiloxane surfactant | 2 | 2 | 2 | 2 |
| Water | Pure water | Balance | Balance | Balance | Balance |
| Total (% by mass) | | 100 | 100 | 100 | 100 |
| Evaluation | Viscosity at 25° C. of ink [mPa · s] | 9 | 9 | 9 | 9 |
|  | Change in viscosity (%), expressed by Formula (1), of ink between before and after storage of the ink at 70° C. for 1 week | 15.8 | 13.2 | 7.8 | 16.4 |
|  | Ratio (A/B) of viscosity A at a shearing rate of 100 (1/s) to viscosity B at a shearing rate of 100,000 (1/s) | 1.74 | 1.82 | 1.92 | 1.96 |
|  | Dischargeability | B | B | B | B |
|  | Static friction force Evaluation | B | B | A | B |
|  | Measurement (gf) | 59 | 59 | 75 | 56 |
|  | Scratch resistance test | B | B | B | B |
|  | Drying time Evaluation | A | A | A | A |
|  | Measurement (min) | 3 | 3 | 3 | 3 |

TABLE 3-2

|  |  | Examples | | | |
| --- | --- | --- | --- | --- | --- |
|  |  | 21 | 22 | 23 | 24 |
| Pigment | Black pigment dispersion liquid (dispersed-by-dispersant type) | 20 | 20 | 20 | 20 |
|  | Cyan pigment dispersion liquid (dispersed-by-dispersant type) | | | | |
|  | Magenta pigment dispersion liquid (dispersed-by-dispersant type) | | | | |
|  | Yellow pigment dispersion liquid (dispersed-by-dispersant type) | | | | |
|  | Black pigment dispersion liquid (resin-coated type) | | | | |
|  | Cyan pigment dispersion liquid (resin-coated type) | | | | |
|  | Magenta pigment dispersion liquid (resin-coated type) | | | | |
|  | Yellow pigment dispersion liquid (resin-coated type) | | | | |
| Resin particles | Acrylic resin (A) | | | | |
|  | Acrylic resin (B) | 5 | 5 | 5 | 5 |
|  | Urethane resin (C) | | | | |
|  | Urethane resin (D) | | | | |
| Plastic organic solvent | 3-Methoxy-N,N-dimethylpropionamide | 5 | 5 | 5 | 5 |
|  | 3-Butoxy-N,N-dimethylpropionamide | | | | |
| Thickener | Thickener (I), Thickening rate by Formula (2): 78% | | | | |
|  | Thickener (II), Thickening rate by Formula (2): 20% | 1 | 0.5 | 0.05 | 0.1 |
|  | Thickener (III), Thickening rate by Formula (2): 68% | | | | |
|  | Thickener (IV), Thickening rate by Formula (2): 200% | | | | |
|  | Thickener (V), Thickening rate by Formula (2): 150% | | | | |
| Water-soluble organic solvent | Propylene glycol (PG) | 20 | 20 | 20 | 5 |

TABLE 3-2-continued

|  |  | Examples | | | |
|---|---|---|---|---|---|
|  |  | 21 | 22 | 23 | 24 |
| Surfactant | Polysiloxane surfactant | 2 | 2 | 2 | 2 |
| Water | Pure water | Balance | Balance | Balance | Balance |
| Total (% by mass) |  | 100 | 100 | 100 | 100 |
| Evaluation | Viscosity at 25° C. of ink [mPa · s] | 9 | 9 | 9 | 9 |
|  | Change in viscosity (%), expressed by Formula (1), of ink between before and after storage of the ink at 70° C. for 1 week | 14.8 | 4.4 | 2.0 | 2.5 |
|  | Ratio (A/B) of viscosity A at a shearing rate of 100 (1/s) to viscosity B at a shearing rate of 100,000 (1/s) | 1.82 | 1.68 | 1.13 | 1.17 |
|  | Dischargeability | B | B | A | A |
|  | Static friction force   Evaluation | A | A | B | A |
|  | Measurement (gf) | 61 | 71 | 50 | 65 |
|  | Scratch resistance test | B | B | B | B |
|  | Drying time   Evaluation | A | A | A | A |
|  | Measurement (min) | 3 | 3 | 3 | 2 |

TABLE 4-1

|  |  | Examples | | | |
|---|---|---|---|---|---|
|  |  | 25 | 26 | 27 | 28 |
| Pigment | Black pigment dispersion liquid (dispersed-by-dispersant type) | 20 | 20 |  |  |
|  | Cyan pigment dispersion liquid (dispersed-by-dispersant type) |  |  | 20 |  |
|  | Magenta pigment dispersion liquid (dispersed-by-dispersant type) |  |  |  | 20 |
|  | Yellow pigment dispersion liquid (dispersed-by-dispersant type) |  |  |  |  |
|  | Black pigment dispersion liquid (resin-coated type) |  |  |  |  |
|  | Cyan pigment dispersion liquid (resin-coated type) |  |  |  |  |
|  | Magenta pigment dispersion liquid (resin-coated type) |  |  |  |  |
|  | Yellow pigment dispersion liquid (resin-coated type) |  |  |  |  |
| Resin particles | Acrylic resin (A) |  |  |  |  |
|  | Acrylic resin (B) | 5 | 5 | 5 | 5 |
|  | Urethane resin (C) |  |  |  |  |
|  | Urethane resin (D) |  |  |  |  |
| Plastic organic solvent | 3-Methoxy-N,N-dimethylpropionamide | 5 | 5 | 5 | 5 |
|  | 3-Butoxy-N,N-dimethylpropionamide |  |  |  |  |
| Thickener | Thickener (I), Thickening rate by Formula (2): 78% |  |  |  |  |
|  | Thickener (II), Thickening rate by Formula (2): 20% | 0.1 | 0.1 | 0.1 | 0.1 |
|  | Thickener (III), Thickening rate by Formula (2): 68% |  |  |  |  |
|  | Thickener (IV), Thickening rate by Formula (2): 200% |  |  |  |  |
|  | Thickener (V), Thickening rate by Formula (2): 150% |  |  |  |  |
| Water-soluble organic solvent | Propylene glycol (PG) | 10 | 25 | 25 | 25 |
| Surfactant | Polysiloxane surfactant | 2 | 2 | 2 | 2 |
| Water | Pure water | Balance | Balance | Balance | Balance |
| Total (% by mass) |  | 100 | 100 | 100 | 100 |
| Evaluation | Viscosity at 25° C. of ink [mPa · s] | 9 | 9 | 9 | 9 |
|  | Change in viscosity (%), expressed by Formula (1), of ink between before and after storage of the ink at 70° C. for 1 week | 3.5 | 3.7 | 3.9 | 4.3 |
|  | Ratio (A/B) of viscosity A at a shearing rate of 100 (1/s) to viscosity B at a shearing rate of 100,000 (1/s) | 1.17 | 1.16 | 1.15 | 1.17 |
|  | Dischargeability | A | A | A | A |
|  | Static friction force   Evaluation | A | B | B | B |
|  | Measurement (gf) | 60 | 56 | 54 | 54 |
|  | Scratch resistance test | B | A | A | A |
|  | Drying time   Evaluation | A | A | A | A |
|  | Measurement (min) | 2.5 | 3 | 3 | 3 |

TABLE 4-2

|  |  | Examples | | | |
| --- | --- | --- | --- | --- | --- |
|  |  | 29 | 30 | 31 | 32 |
| Pigment | Black pigment dispersion liquid (dispersed-by-dispersant type) | | | | |
|  | Cyan pigment dispersion liquid (dispersed-by-dispersant type) | | | | |
|  | Magenta pigment dispersion liquid (dispersed-by-dispersant type) | | | | |
|  | Yellow pigment dispersion liquid (dispersed-by-dispersant type) | 20 | | | |
|  | Black pigment dispersion liquid (resin-coated type) | | | | |
|  | Cyan pigment dispersion liquid (resin-coated type) | | 20 | | |
|  | Magenta pigment dispersion liquid (resin-coated type) | | | 20 | |
|  | Yellow pigment dispersion liquid (resin-coated type) | | | | 20 |
| Resin particles | Acrylic resin (A) | | | | |
|  | Acrylic resin (B) | 5 | 5 | 5 | 5 |
|  | Urethane resin (C) | | | | |
|  | Urethane resin (D) | | | | |
| Plastic organic solvent | 3-Methoxy-N,N-dimethylpropionamide | 5 | 5 | 5 | 5 |
|  | 3-Butoxy-N,N-dimethylpropionamide | | | | |
| Thickener | Thickener (I), Thickening rate by Formula (2): 78% | | | | |
|  | Thickener (II), Thickening rate by Formula (2): 20% | 0.1 | 0.1 | 0.1 | 0.1 |
|  | Thickener (III), Thickening rate by Formula (2): 68% | | | | |
|  | Thickener (IV), Thickening rate by Formula (2): 200% | | | | |
|  | Thickener (V), Thickening rate by Formula (2): 150% | | | | |
| Water-soluble organic solvent | Propylene glycol (PG) | 25 | 25 | 25 | 25 |
| Surfactant | Polysiloxane surfactant | 2 | 2 | 2 | 2 |
| Water | Pure water | Balance | Balance | Balance | Balance |
| Total (% by mass) | | 100 | 100 | 100 | 100 |
| Evaluation | Viscosity at 25° C. of ink [mPa · s] | 9 | 9 | 9 | 9 |
|  | Change in viscosity (%), expressed by Formula (1), of ink between before and after storage of the ink at 70° C. for 1 week | 4.1 | 3.5 | 4.1 | 4.4 |
|  | Ratio (A/B) of viscosity A at a shearing rate of 100 (1/s) to viscosity B at a shearing rate of 100,000 (1/s) | 1.16 | 1.16 | 1.17 | 1.17 |
|  | Dischargeability | A | A | A | A |
|  | Static friction force  Evaluation | B | B | B | B |
|  | Measurement (gf) | 53 | 52 | 54 | 55 |
|  | Scratch resistance test | B | B | B | B |
|  | Drying time  Evaluation | A | A | A | A |
|  | Measurement (min) | 3 | 3 | 3 | 3 |

TABLE 5

|  |  | Comparative Examples | | | | |
| --- | --- | --- | --- | --- | --- | --- |
|  |  | 1 | 2 | 3 | 4 | 5 |
| Pigment | Black pigment dispersion liquid (dispersed-by-dispersant type) | | 20 | 20 | | 20 |
|  | Cyan pigment dispersion liquid (dispersed-by-dispersant type) | | | | | |
|  | Magenta pigment dispersion liquid (dispersed-by-dispersant type) | | | | | |
|  | Yellow pigment dispersion liquid (dispersed-by-dispersant type) | | | | | |
|  | Black pigment dispersion liquid (resin-coated type) | 20 | | | 20 | |
|  | Cyan pigment dispersion liquid (resin-coated type) | | | | | |
|  | Magenta pigment dispersion liquid (resin-coated type) | | | | | |
|  | Yellow pigment dispersion liquid (resin-coated type) | | | | | |

TABLE 5-continued

|  |  | Comparative Examples | | | | |
|---|---|---|---|---|---|---|
|  |  | 1 | 2 | 3 | 4 | 5 |
| Resin particles | Acrylic resin (A) | | | | | |
|  | Acrylic resin (B) | 10 | 10 | 10 | 10 | |
|  | Urethane resin (C) | | | | | |
|  | Urethane resin (D) | | | | | |
| Plastic organic solvent | 3-Methoxy-N,N-dimethylpropionamide | 5 | 5 | 5 | 5 | 5 |
|  | 3-Butoxy-N,N-dimethylpropionamide | | | | | |
| Thickener | Thickener (I), Thickening rate by Formula (2): 78% | | 0.01 | 3 | 3 | |
|  | Thickener (II), Thickening rate by Formula (2): 20% | | | | | |
|  | Thickener (III), Thickening rate by Formula (2): 68% | | | | | 0.1 |
|  | Thickener (IV), Thickening rate by Formula (2): 200% | | | | | |
|  | Thickener (V), Thickening rate by Formula (2): 150% | | | | | |
| Water-soluble organic solvent | Propylene glycol (PG) | 35 | 20 | 20 | 20 | 30 |
| Surfactant | Polysiloxane surfactant | 2 | 2 | 2 | 2 | 2 |
| Water | Pure water | Bal* | Bal. | Bal. | Bal. | Bal. |
| Total (% by mass) | | 100 | 100 | 100 | 100 | 100 |
| Evaluation | Viscosity at 25° C. of ink [mPa · s] | 9 | 9 | 9 | 9 | 9 |
|  | Change in viscosity (%), expressed by Formula (1), of ink between before and after storage of the ink at 70° C. for 1 week | 3.2 | 3.3 | 85.5 | 92.3 | 2.5 |
|  | Ratio (A/B) of viscosity A at a shearing rate of 100 (1/s) to viscosity B at a shearing rate of 100,000 (1/s) | 1.09 | 1.31 | 2.52 | 2.47 | 1.22 |
|  | Dischargeability | A | A | D | D | A |
|  | Static friction force — Evaluation | C | C | D | D | D |
|  | Measurement (gf) | 48 | 48 | 45 | 45 | 35 |
|  | Scratch resistance test | D | D | D | D | D |
|  | Drying time — Evaluation | B | A | A | A | A |
|  | Measurement (min) | 4 | 3 | 3 | 3 | 3 |

*Bal. is an abbreviation of Balance in Table 5.

Details of the components in Table 1-1 to Table 5 are as follows.

—Resin

Acrylic resin (A): product name: Mowinyl 6969D, obtained from Japan Coating Resin Co., Ltd., volume average particle diameter: 110 nm, concentration of solid portion: 42% by mass Acrylic resin (B): product name: Mowinyl 6899D, obtained from Japan Coating Resin Co., Ltd., volume average particle diameter: 100 nm, concentration of solid portion: 46% by mass Urethane resin (C): product name: W6110, obtained from Mitsui Chemicals, Inc., volume average particle diameter: 90 nm, concentration of solid portion: 33% by mass Urethane resin (D): product name: SUPERFLEX 210, obtained from DAIICHI KOGYO Co., Ltd., volume average particle diameter: 40 nm, concentration of solid portion: 35% by mass —Plastic Organic Solvent—

3-Methoxy-N,N-dimethylpropionamide, product name: Ecamide M-100, obtained from Idemitsu Kosan Co., Ltd.

3-Butoxy-N,N-dimethylpropionamide, product name: KJCBPA (registered trademark)-100, obtained from KJ Chemicals Corporation —Thickener—

The thickener preferably has a thickening rate of 10% or higher, expressed by Formula (2) below:

$$\text{Thickening rate (\%)} = [(\alpha - \beta)/\beta] \times 100 \quad \text{Formula (2)}.$$

In the Formula (2), α represents a viscosity (mPa·s) at 25° C. of the ink when the thickener is added to the ink in an amount of 0.1% by mass, and β represents a viscosity (mPa·s) at 25° C. of the ink before the thickener is added to the ink.

The viscosity of the ink was measured in the same manner as described above.

Thickener (I), carboxylic acid-based copolymer, the thickening rate expressed by the Formula (2) is 78%, product name: A-7055, obtained from TOAGOSEI CO., LTD., volume average particle diameter: 120 nm Thickener (II), carboxylic acid-based copolymer, the thickening rate expressed by the Formula (2) is 20%, product name: B-300K, obtained from TOAGOSEI CO., LTD., volume average particle diameter: 120 nm Thickener (III), carboxylic acid-based copolymer, the thickening rate expressed by the Formula (2) is 68%, product name: B-500, obtained from TOAGOSEI CO., LTD., volume average particle diameter: 120 nm Thickener (IV), carboxymethyl cellulose, the thickening rate expressed by the Formula (2) is 200%, product name: 1220, obtained from Daicel Miraizu Ltd., volume average particle diameter: 100 nm Thickener (V), polysaccharide, the thickening rate expressed by the Formula (2) is 150%, product name: sodium alginate, obtained from DSP GOKYO FOOD & CHEMICAL Co., Ltd., volume average particle diameter: 10 nm —Water-Soluble Organic Solvent—

PG: Propylene glycol, product name: propylene glycol, obtained from Kurimoto Pharmaceutical Industries Corp., Ltd.

—Surfactant—

Polysiloxane surfactant: product name: BYK-348, obtained from BYK Chemie Japan K.K.

Aspects of the present disclosure are as follows, for example.

<1> An ink including:
    water;
    an organic solvent;
    resin particles; and
    a thickener, wherein:
    the thickener comprises polymer particles having a carboxylic acid structure;
    an proportion of the thickener in the ink is 0.05% by mass or more; and
    change in viscosity of the ink between before and after storage of the ink at 70° C. for 1 week is 20% or less, and the change in viscosity is expressed by Formula (1) below:

$$\text{Change in viscosity (\%)} = [(a-b)/b] \times 100 \qquad \text{Formula (1),}$$

where a represents a viscosity (mPa·s) at 25° C. of the ink when the ink is prepared, and b represents a viscosity (mPa·s) at 25° C. of the ink after the ink is stored at 70° C. for 1 week.

<2> The ink according to <1> above, wherein the change in viscosity expressed by the Formula (1) is 8% or less.

<3> The ink according to <1> or <2> above, wherein the proportion of the thickener in the ink is 0.05% by mass or more but 1% by mass or less.

<4> The ink according to any one of <1> to <3> above, wherein a ratio (A/B) is 1.50 or less, where A denotes a viscosity of the ink at a shearing rate of 100 (1/s) and B denotes a viscosity of the ink at a shearing rate of 100,000 (1/s).

<5> The ink according to any one of <1> to <4> above, wherein the thickener has a thickening rate of 10% or more, and the thickening rate is expressed by Formula (2) below:

$$\text{Thickening rate (\%)} = [(\alpha-\beta)/\beta] \times 100 \qquad \text{Formula (2),}$$

where $\alpha$ represents a viscosity (mPa·s) at 25° C. of the ink when the thickener in an amount of 0.1% by mass of the ink is added to the ink, and $\beta$ represents a viscosity (mPa·s) at 25° C. of the ink before the thickener is added to the ink.

<6> The ink according to any one of <1> to <5> above, wherein a proportion of the organic solvent is 5% by mass or more but 30% by mass or less.

<7> The ink according to any one of <1> to <6> above, wherein the resin particles comprise at least one selected from the group consisting of acrylic resin particles and polyurethane resin particles.

<8> The ink according to any one of <1> to <7> above, wherein the viscosity at 25° C. of the ink is 6 mPa·s or higher but 13 mPa·s or lower.

<9> The ink according to any one of <1> to <8> above, wherein the ink is an inkjet ink.

<10> A printing method including
    allowing energy to act on the ink according to any one of <1> to <9> above to discharge the ink, to form an image.

<11> The printing method according to <10> above, further including heating the image.

<12> A printing device including:
    an ink container containing the ink according to any one of <1> to <9> above; and
    an ink discharging unit configured to allow energy to act on the ink to discharge the ink, to form an image.

<13> A printed matter including:
    a print medium; and
    an ink layer on the print medium, the ink layer containing a solid portion in the ink according to any one of <1> to <9> above.

The ink according to any one of <1> to <9> above, the printing method according to <10> or <11> above, the printing device according to <12> above, and the printed matter according to <13> above can solve the problems in the art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink comprising:
    water;
    an organic solvent;
    resin particles; and
    a thickener, wherein:
    the thickener comprises carboxylic acid-based copolymer particles having a carboxylic acid structure;
    a proportion of the thickener in the ink is 0.5% by mass or more and 2% by mass or less; and
    change in viscosity of the ink between before and after storage of the ink at 70° C. for 1 week is 20% or less, and the change in viscosity is expressed by Formula (1) below:

$$\text{Change in viscosity (\%)} = [(a-b)/b] \times 100 \qquad \text{Formula (1),}$$

where a represents a viscosity (mPa·s) at 25° C. of the ink when the ink is prepared, and b represents a viscosity (mPa·s) at 25° C. of the ink after the ink is stored at 70° C. for 1 week.

2. The ink according to claim 1, wherein the change in viscosity expressed by the Formula (1) is 8% or less.

3. The ink according to claim 1, wherein the proportion of the thickener in the ink is 0.5% by mass or more and 1% by mass or less.

4. The ink according to claim 1, wherein a ratio (A/B) is 1.50 or less, where A denotes a viscosity of the ink at a shearing rate of 100 (1/s) and B denotes a viscosity of the ink at a shearing rate of 100,000 (1/s).

5. The ink according to claim 1, wherein the thickener has a thickening rate of 10% or more, and the thickening rate is expressed by Formula (2) below:

$$\text{Thickening rate (\%)} = [(\alpha-\beta)/\beta] \times 100 \qquad \text{Formula (2),}$$

where $\alpha$ represents a viscosity (mPa·s) at 25° C. of the ink when the thickener in an amount of 0.1% by mass of the ink is added to the ink, and $\beta$ represents a viscosity (mPa·s) at 25° C. of the ink before the thickener is added to the ink.

6. The ink according to claim 1, wherein a proportion of the organic solvent in the ink is 5% by mass or more and 30% by mass or less.

7. The ink according to claim 1, wherein the resin particles comprise at least one selected from the group consisting of acrylic resin particles and polyurethane resin particles.

8. The ink according to claim 1, wherein the viscosity at 25° C. of the ink is 6 mPa·s or higher and 13 mPa·s or lower.

9. The ink according to claim 1, wherein the ink is an inkjet ink.

10. A printing method comprising
allowing energy to act on the ink according to claim 1 to discharge the ink, to form an image.

11. The printing method according to claim 10, further comprising heating the image.

12. A printing device comprising:
an ink container containing the ink according to claim 1; and
an ink discharging unit configured to allow energy to act on the ink to discharge the ink, to form an image.

13. A printed matter comprising:
a print medium; and
an ink layer on the print medium, the ink layer containing a solid portion in the ink according to claim 1.

* * * * *